(12) United States Patent
deJong et al.

(10) Patent No.: US 9,989,710 B2
(45) Date of Patent: Jun. 5, 2018

(54) MULTI-FIBER FERRULE AND OPTICAL CONNECTOR INCLUDING THE SAME

(71) Applicant: Corning Optical Communications LLC, Hickory, NC (US)

(72) Inventors: Michael deJong, Colleyville, TX (US); Esteban Belisario Marin, Hickory, NC (US); Hieu Vinh Tran, Charlotte, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days. days.

(21) Appl. No.: 15/336,891

(22) Filed: Oct. 28, 2016

(65) Prior Publication Data
US 2017/0153397 A1    Jun. 1, 2017

Related U.S. Application Data

(60) Provisional application No. 62/260,757, filed on Nov. 30, 2015.

(51) Int. Cl.
*G02B 6/38* (2006.01)

(52) U.S. Cl.
CPC ......... *G02B 6/3885* (2013.01); *G02B 6/3861* (2013.01); *G02B 6/3883* (2013.01); *G02B 6/3887* (2013.01)

(58) Field of Classification Search
None
See application file for complete search history.

(56) References Cited

U.S. PATENT DOCUMENTS

| 4,708,433 A * | 11/1987 | Kakii ................ B29C 45/14467 |
| | | 385/54 |
| 5,193,133 A | 3/1993 | Schofield et al. |
| 5,333,223 A | 7/1994 | Schofield et al. |
| 6,629,781 B2 * | 10/2003 | Shigenaga ........... G02B 6/3839 |
| | | 385/59 |
| 6,957,920 B2 | 10/2005 | Luther et al. |
| D526,276 S * | 8/2006 | Shiraishi ...................... D13/146 |
| 7,354,202 B1 | 4/2008 | Luger |

(Continued)

FOREIGN PATENT DOCUMENTS

DE    102013217062 A1    3/2014
JP       10048468 A       2/1998
(Continued)

OTHER PUBLICATIONS

International Search Report and Written Opinion PCT/US2016/057714 dated Feb. 6, 2017.

*Primary Examiner* — Tina Wong
(74) *Attorney, Agent, or Firm* — Adam R. Weeks (57) ABSTRACT

A ferrule for an optical connector includes a body, a cavity extending into the body from a back end of the body, and first and second groups of micro-holes extending into the cavity from a front end of the body. The cavity includes at least one bottom surface extending under an opening in a top surface of the body and below a first plane that extends through or below the first and second groups of micro-holes. The cavity also includes a divider extending under the opening in the top surface of the body, with the divider having a divider surface positioned above the first plane such that the divider surface is offset from the at least one bottom surface.

20 Claims, 5 Drawing Sheets

FIG. 5

(56) References Cited

U.S. PATENT DOCUMENTS

| | | | |
|---|---|---|---|
| 7,517,159 B1 * | 4/2009 | Rolston | G02B 6/4214 385/49 |
| 7,543,994 B2 * | 6/2009 | McColloch | G02B 6/4214 385/115 |
| 7,985,026 B1 * | 7/2011 | Lin | G02B 6/32 385/55 |
| 8,016,491 B2 | 9/2011 | Takaoka et al. | |
| 8,366,326 B2 * | 2/2013 | Lin | G02B 6/3849 385/76 |
| 8,388,238 B2 * | 3/2013 | Ohmura | G02B 6/3846 385/65 |
| 8,454,243 B2 * | 6/2013 | Hsu | G02B 6/32 385/74 |
| 8,523,459 B2 | 9/2013 | Danley et al. | |
| 9,086,547 B2 * | 7/2015 | McColloch | G02B 6/3839 |
| 9,465,170 B1 * | 10/2016 | Childers | G02B 6/3853 |
| 9,563,027 B2 * | 2/2017 | Childers | G02B 6/3831 |
| 2002/0146215 A1 * | 10/2002 | Ogawa | G02B 6/3839 385/80 |
| 2008/0095502 A1 * | 4/2008 | McColloch | G02B 6/3825 385/71 |
| 2009/0041412 A1 | 2/2009 | Danley et al. | |
| 2012/0051697 A1 | 3/2012 | Kadar-Kallen et al. | |
| 2012/0301073 A1 * | 11/2012 | DeMeritt | G02B 6/4204 385/14 |
| 2015/0331201 A1 | 11/2015 | Takano et al. | |
| 2017/0146748 A1 * | 5/2017 | Childers | G02B 6/3853 |

FOREIGN PATENT DOCUMENTS

| | | |
|---|---|---|
| JP | 2002006177 A | 1/2002 |
| JP | 2010122331 A | 6/2010 |
| WO | 2003009023 A2 | 1/2003 |
| WO | 2004023168 A2 | 3/2004 |
| WO | 2013159015 A1 | 10/2013 |

\* cited by examiner

MULTI-FIBER FERRULE AND OPTICAL CONNECTOR INCLUDING THE SAME

PRIORITY APPLICATION

This application claims the benefit of priority under 35 U.S.C. § 119 of U.S. Provisional Application Ser. No. 62/260,757, filed on Nov. 30, 2015, the content of which is relied upon and incorporated herein by reference in its entirety.

BACKGROUND

This disclosure relates generally to optical fibers, and more particularly to ferrules for multi-fiber optical connectors, along with optical connectors and cable assemblies including such ferrules, and methods relating to these components.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, optical connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using "field-installable" connectors).

Many different types of optical connectors exist. In environments that require high density interconnects and/or high bandwidth, such as datacenters, multi-fiber optical connectors are the most widely used. One example is the multi-fiber push on (MPO) connector, which incorporates a mechanical transfer (MT) ferrule and is standardized according to TIA-604-5 and IEC 61754-7. These connectors can achieve a very high density of optical fibers, which reduces the amount of hardware, space, and effort to establish a large number of interconnects.

Despite the widespread use of MPO connectors in datacenter environments, there are still challenges/issues to address. For example, although MPO connectors may contain any even number of fibers between 4 and 24 within the same physical package, 12-fiber connectors are the most commonly used. For some applications, such as parallel optics for 40 Gps Ethernet, only 8 active fibers are needed. Conversion modules may be used to convert the unused fibers from two or more MPO connectors into usable optical links (e.g., converting 4 unused fibers from each of two MPO connectors into 8 useable optical links), but the conversion adds costs to a network. Alternatively, cable assemblies can be built with only 8-fibers terminated by an MPO connector, but the MPO connector still resembles a 12-fiber connector. In other words, it can be difficult to see with the naked eye whether 8 fibers or 12 fibers are present. This uncertainty in fiber count may result in network issues if a connector with 12 active fibers is inadvertently mated to a connector with only 8 active fibers.

Additionally, securing the optical fibers in the ferrule of an MPO connector can be a challenge. An adhesive material is typically used for this purpose, with adhesive material being injected or otherwise supplied into an internal cavity of the ferrule. There must be sufficient adhesive material to ensure that the optical fibers are sufficiently bonded/secured to the ferrule. To avoid uncertainty on whether a sufficient amount of adhesive material is supplied, there may be a tendency to completely fill the internal cavity of the ferrule. Doing so, however, may increase the likelihood of the adhesive material being disposed on an exterior of the ferrule or otherwise exiting the ferrule, both of which may interfere with the normal operation of the ferrule as part of an optical connector.

SUMMARY

Embodiments of a ferrule for an optical connector that is configured to accept a plurality of optical fibers are disclosed below. According to one embodiment, the ferrule includes a body having a front end and a back end, a cavity extending into the body from the back end of the body, and first and second groups of micro-holes extending into the cavity from the front end of the body. The body extends in a longitudinal direction between the front end and the back end, and includes a top surface between the front and back end and an opening through the top surface into the cavity. The cavity further includes at least one bottom surface extending under at least a portion of the opening in the top surface of the body, the at least one bottom surface being positioned below a first plane that extends in the longitudinal direction through or below the first and second groups of micro-holes. The cavity also includes a divider extending under at least a portion of the opening in the top surface of the body, the divider having a divider surface positioned above the first plane. Each micro-hole is configured to receive one of the optical fibers when the optical fibers are inserted through the cavity.

Methods of terminating a plurality of optical fibers with a ferrule, such as the ferrule described in the preceding paragraph, are also provided. One such method involves extending the optical fibers through the back end of the body of the ferrule, through the cavity of the body, and into the first and second groups of micro-holes. The method also involves disposing an adhesive material in the cavity of the body to secure the optical fibers to the ferrule. The adhesive material is disposed in the cavity by: supplying the adhesive material into the cavity; viewing the divider surface through the opening in the top surface of the body of the ferrule while the adhesive material is supplied; and stopping the step of supplying the adhesive material when the adhesive material covers at least a portion of the divider surface.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
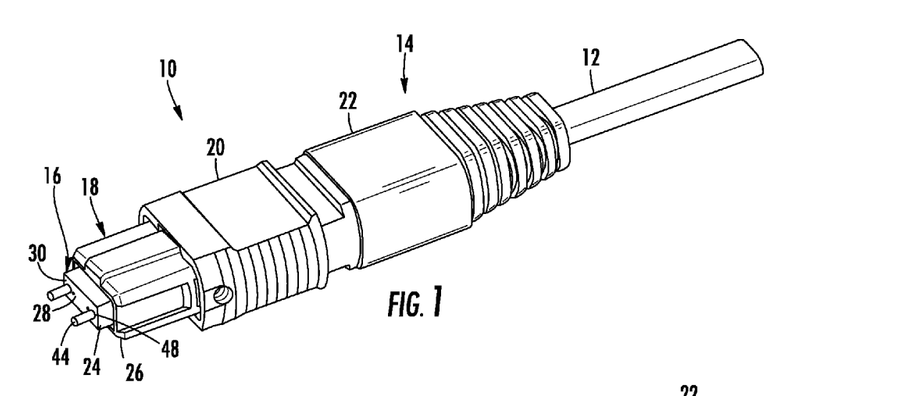
FIG. 1 a perspective view of an example of an optical connector.
Figure 2:
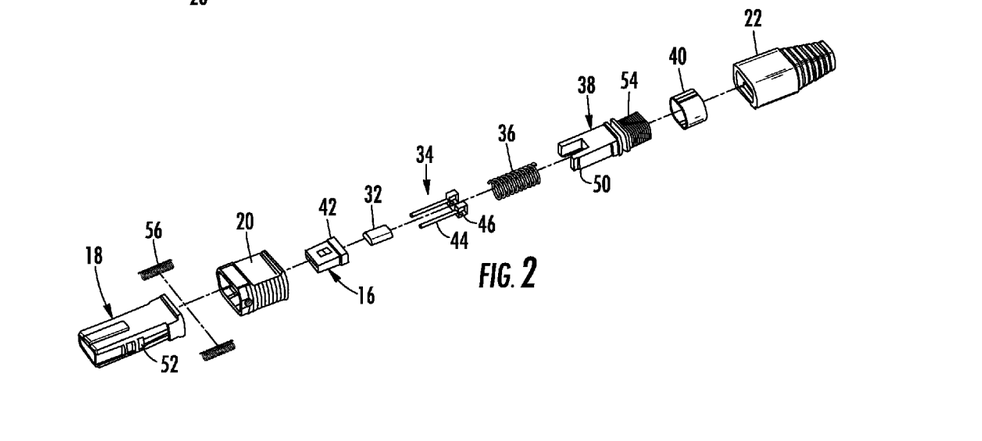
FIG. 2 is an exploded perspective view of the optical connector of FIG. 1.

Various embodiments will be further clarified by examples in the description below. In general, the description relates to multi-fiber ferrules and fiber optic connectors and cable assemblies incorporating such multi-fiber ferrules. The fiber optic connectors may be based on known connector designs, such as MPO connectors. To this end, FIGS. 1 and 2 illustrate a fiber optic connector 10 (also referred to as "optical connector" or simply "connector") in the form of an MTP® connector, which is particular type of MPO connector (MTP® is a trademark of US Conec Ltd.). A brief overview of the connector 10 will be provided to facilitate discussion, as the multi-fiber ferrules and other components shown in subsequent figures may be used in connection with the same type of connector as the connector 10. However, persons skilled in the field of optical connectivity will appreciate that the connector 10 is merely an example, and that the general principles disclosed with respect to the multi-fiber ferrules and other components shown in subsequent figures may also be applicable to other connector designs.

As shown in FIG. 1, the connector 10 may be installed on a fiber optic cable 12 ("cable") to form a fiber optic cable assembly 14. The connector includes a ferrule 16, a housing 18 received over the ferrule 16, a slider 20 received over the housing 18, and a boot 22 received over the cable 12. The ferrule 16 is spring-biased within the housing 18 so that a front portion 24 of the ferrule 16 extends beyond a front end 26 of the housing 18. Optical fibers (not shown) carried by the cable 12 extend through micro-holes or bores 28 in the ferrule 16 before terminating at or near an end face 30 of the ferrule 16. The optical fibers are secured within the ferrule 16 using an adhesive material (e.g., epoxy) and can be presented for optical coupling with optical fibers of a mating component (e.g., another fiber optic connector; not shown) when the housing 20 is inserted into an adapter, receptacle, or the like.

As shown in FIG. 2, the connector 10 also includes a ferrule boot 32, guide pin assembly 34, spring 36, crimp body 38, and crimp ring 40. The ferrule boot 32 is received in a rear portion 42 of the ferrule 16 to help support the optical fibers extending to the ferrule bores 28 (FIG. 1). The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 16, and the guide pins 44 extend through pin holes 48 (FIG. 1) provided in the ferrule 16 so as to project beyond the front end face 30.

Both the ferrule 16 and guide pin assembly 34 are biased to a forward position relative to the housing 18 by the spring 36. More specifically, the spring 36 is positioned between the pin keeper 46 and a portion of the crimp body 38. The crimp body 38 is inserted into the housing 18 when the connector 10 is assembled and includes latching arms 50 that engage recesses 52 in the housing. The spring 36 is compressed by this point and exerts a biasing force on the ferrule 16 via the pin keeper 46. The rear portion 42 of the ferrule defines a flange that interacts with a shoulder or stop formed within the housing 18 to retain the rear portion 42 within the housing 18.

In a manner not shown in the figures, aramid yarn or other strength members from the cable 12 are positioned over an end portion 54 of the crimp body 38 that projects rearwardly from the housing 18. The aramid yarn is secured to the end portion 54 by the crimp ring 40, which is slid over the end portion 54 and deformed after positioning the aramid yarn. The boot 22 covers this region, as shown in FIG. 1, and provides strain relief for the optical fibers by limiting the extent to which the connector 10 can bend relative to the cable 12.

Figure 3:
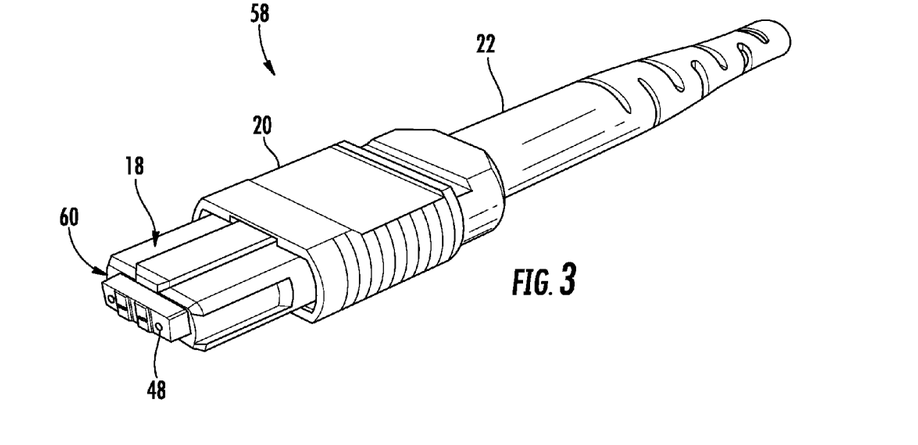
FIG. 3 is a perspective view of an optical connector according to one embodiment of this disclosure.
Figure 4:
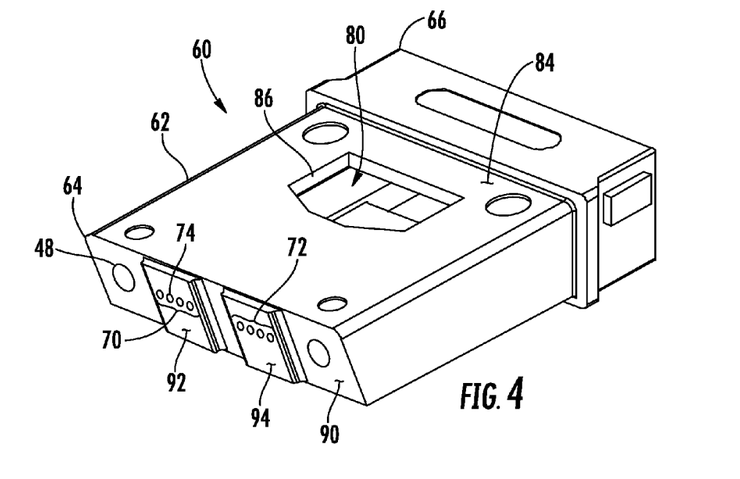
FIG. 4 is a perspective view of a ferrule of the optical connector of FIG. 3.

Now that a general overview of the connector 10 has been provided, alternative ferrule designs will be described. To this end, FIG. 3 illustrates an optical connector 58 including a ferrule 60 according to one alternative embodiment, and FIG. 4 illustrates the ferrule 60 in isolation. The optical connector 58 and ferrule 60 are similar to the connector 10 and ferrule 16 in some respects such that the same reference numbers will be used where appropriate to refer to corresponding structure. For example, the ferrule 60 also includes pin holes 48. In FIGS. 3 and 4, the pin holes 48 are empty such that the embodiment represents a female configuration of the ferrule 60. For a male configuration, respective guide pins (not shown in FIGS. 3 and 4) may be received in the pin holes 48 and project beyond a front end of the ferrule 60, similar to the embodiment in FIGS. 1 and 2. Although two pin holes 48 are shown in the figures, any number of pin holes 48 may be provided in alternative embodiments.

The ferrule 60 includes a body 62 extending in a longitudinal direction (i.e., along a longitudinal axis) between front and back ends 64, 66 of the body 62. The front end 64 of the body 62 defines a first end face 90 and two additional end faces 92, 94 offset from the first end face 90 in the longitudinal direction of the body 62. As a result of the offsets, the front end 64 of the body 62 has a dual-pedestal configuration (i.e., two pedestals protrude from the first end face 90). Additional details and advantages relating to the pedestals will be described in greater detail below after first describing other features of the ferrule 60 shown in FIGS. 3 and 4. The other features that will be described first are not dependent upon the dual-pedestal configuration. In other embodiments, for example, the front end 64 of the body 62 may include a single pedestal/additional end face or no pedestals at all.

With this in mind and still referring to FIGS. 3 and 4, the ferrule 60 includes first and second groups 70, 72 of micro-holes 74 extending into the body 62 from the first end 62 (specifically, from the respective additional end faces 92, 94 in the embodiment shown). Each micro-hole 74 is configured to receive an optical fiber. There are four micro-holes 74 in each of the first and second groups 70, 72 in the embodiment shown. Furthermore, there are no other micro-holes in the embodiment shown; no micro-holes extend into the body 62 from the first end face 90. Thus, the portion of the body 62 between the first and second groups 70, 72 of micro-holes 74 (and, therefore, between the pedestals in the embodiment shown) is itself free of micro-holes. Being designed to only accommodate two groups of four optical fibers makes the ferrule 60 particularly suited for parallel optics applications for 40 Gps transmission in that there would be no unused optical fibers or empty micro-holes if used for such applications. Structural features can also be provided inside the ferrule 60 to provide additional benefits.

Figure 5:
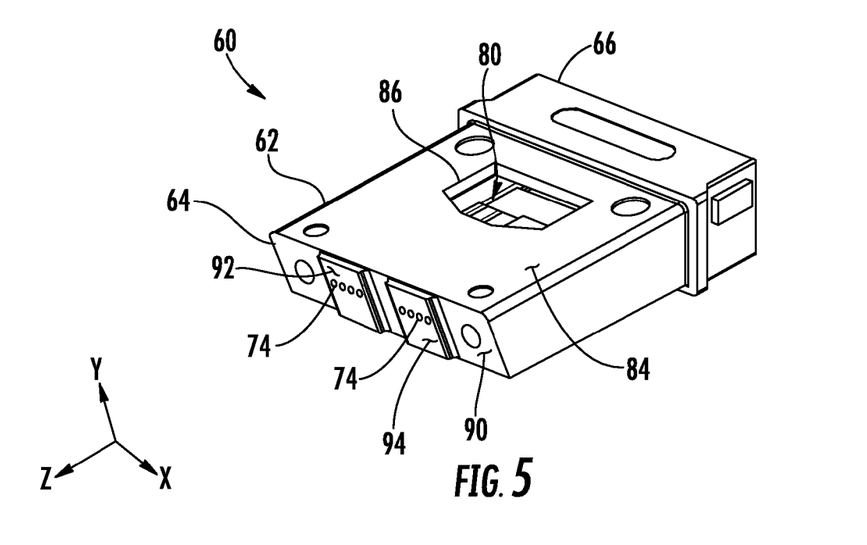
FIG. 5 is a perspective view of the ferrule of FIG. 4 having a different orientation.
Figure 6:
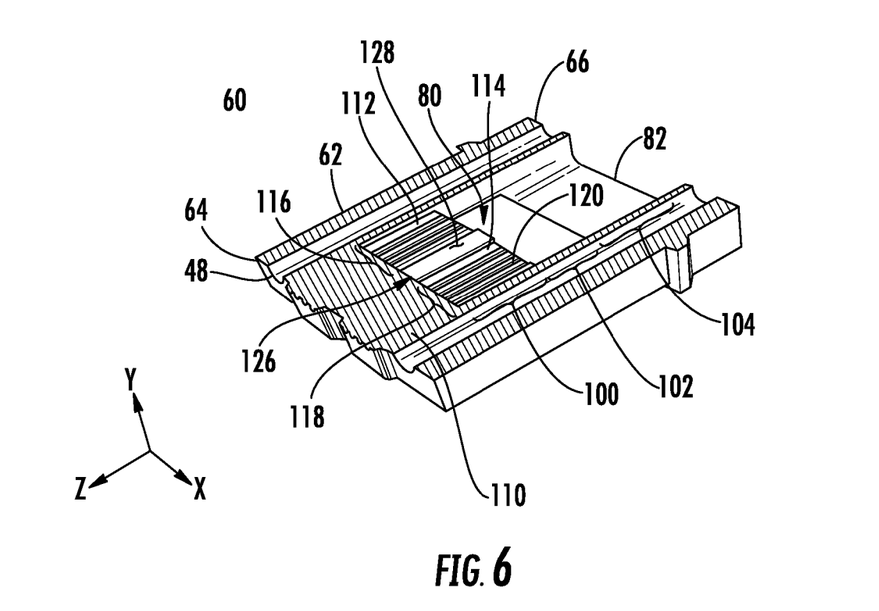
FIG. 6 is a cross-sectional perspective view of FIG. 5.
Figure 7:
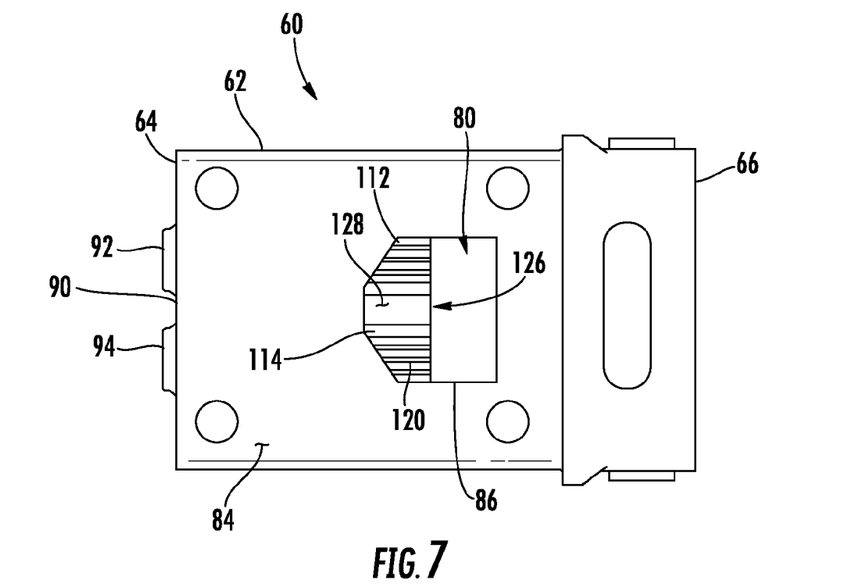
FIG. 7 is a top plan view of the ferrule of FIG. 4.
Figure 8:
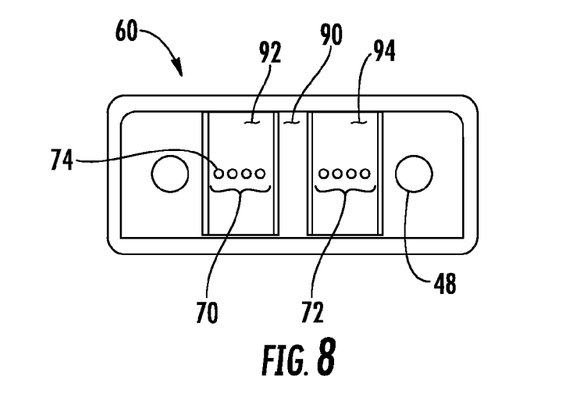
FIG. 8 is a front elevation view of the ferrule of FIG. 4.

To better view such internal features of the ferrule 60, FIG. 5 is a perspective view of the ferrule 60 with a slightly different orientation than FIG. 4, and FIG. 6 is a cross-sectional view of the orientation shown in FIG. 5. As shown in FIGS. 5 and 6, the body 62 of the ferrule 60 includes a cavity or chamber 80 extending into the body 62 from the back end 66. Accordingly, the back end 66 defines an opening 82 into the cavity 80. An outer surface 84 of the body 62 that is between the front and back ends 64, 66 of the body 62 also includes an opening 86 into the cavity 80. The opening 86 extends through the outer surface 84 so that an adhesive material applied to optical fibers in the cavity 80 can be seen through the opening 84, as will be described in greater detail below.

To facilitate discussion, the outer surface 84 of the body 62 will be referred to as a "top surface" of the body 62 because the ferrule is oriented with the outer surface 84 facing upwards in the figures. Terms associated with a vertical direction or axis, such as "top", "bottom", "above", "below", "over", "under", and "height" will be made with reference to the orientation shown in the figures, with the vertical direction or axis being perpendicular to the longitudinal axis of the body 62. A Cartesian coordinate system may even be used to facilitate discussion, where the longitudinal direction of the body 62 is along a z-axis (or "z-direction") of such a coordinate system. An xy-plane including an x-axis and y-axis is perpendicular to the longitudinal direction, with the micro-holes 74 generally aligned along the x-axis (or "x-direction") so that the y-axis (or "y-direction") is perpendicular to micro-holes 74.

Referring specifically to FIG. 6, the cavity 80 in the embodiment shown includes three different sections: a first section 100 into which the micro-holes 74 open, a second section 102 proximate the first section 100 but having at least a greater depth than the first section 100, and a third section 104 between the second section 102 and back end 66 of the body 62. The third section 104 has at least a greater depth than the second section 102 and is designed to accommodate at least a portion of the ferrule boot 32 (FIG. 2). The term "depth" refers to the extent to which the cavity 80 extends perpendicular to the longitudinal axis of the body 62, i.e. in the y-axis or y-direction, from the top surface 84. Thus, when viewing a cross-section of the cavity 80 in a plane that is perpendicular to the longitudinal direction (i.e., in the xy-plane using the coordinate system introduced above), the depth refers to height of the cavity 80. An alternative way to state relationships between the first section 100, second section 102, and third section 104 is to express the relationships in terms of cross-sectional area. For example, when viewing each section in a respective plane that is perpendicular to the longitudinal direction (i.e., a respective xy-plane), the second section 102 has a greater cross-sectional area than the first section 100, and the third section 104 has a greater cross-sectional area than the second section 102. This effectively provides a "stepped" arrangement where the cavity 80 progressively increases in cross-sectional area between each section, moving from the first section 100 to the third section 104.

Still referring to FIG. 6, there is a portion 110 of the body 62 through which the micro-holes 74 extend before reaching the first section 102 of the cavity 80. The cross-sectional plane in FIG. 6 is just above the micro-holes 74, which is why the micro-holes 74 cannot be seen in cross-section. The first section 100 includes first and second bottom surfaces 112, 114 positioned below a plane that extends in the longitudinal direction through or below the micro-holes 74. In the embodiment shown, the first and second bottom surfaces 112, 114 are co-planar are aligned in the xz-plane. The first and second bottom surfaces 112, 114 include respective first and second groups 116, 118 of guides 120, such as v-grooves, aligned with the respective first and second groups 70, 72 of micro-holes 74. The guides 120 facilitate inserting optical fibers into the micro-holes 74. In particular, each of the guides 120 is configured to direct an optical fiber into one of the micro-holes 74 when the optical fiber is inserted through the cavity 80 from the back end 66 of the body 62.

The first section 100 of the cavity 80 further includes a divider 126 positioned between the first and second bottom surfaces 112, 114 (and, therefore, between the first and second groups 116, 118 of guides 120 in the embodiment shown). As shown in the figures, the divider 126 may be a wall or partition that extends in the longitudinal direction and separates the first and second bottom surfaces 112, 114. As such, the divider 126 includes a divider surface 128 positioned above the first and second bottom surfaces 112, 114. Stated differently, the divider surface 128 is positioned above the first plane that extends through or below the micro-holes 74 and that is positioned above the first and second bottom surfaces 112, 114. The divider surface 128 may be planar and/or parallel to the first and second bottom surfaces 112, 114, as shown.

Note that both the first and second bottom surfaces 112, 114 and the divider 126 extend under at least a portion of the opening 86 in the top surface 84 of the body 62. Such an arrangement enables the divider 126 to be designed as a reference to facilitate securing the optical fibers to the ferrule 60 with an adhesive material, such as epoxy. For example, and with additional reference to FIG. 9, the first and second groups 130, 132 of optical fibers 134 may be prepared for insertion into the ferrule 60 in a conventional manner (e.g., removing outer coatings, removing some matrix material if in ribbon form, etc.). The optical fibers 134 may then be extended through the back end 66 of the body 62 of the ferrule 60, through the cavity 80, and into the first and second groups 70, 72 of micro-holes 74, potentially using the guides 120 to assist with the insertion into the micro-holes 74. A ferrule boot, like the ferrule boot 32 in FIG. 2, may be received in the third section 104 of the cavity 80 before, during, or after inserting the optical fibers 134 into the cavity 80. The ferrule boot helps support the optical fibers 134 in the third section 104 and can help with the insertion of the optical fibers 134 into the cavity 80.

Figure 9:
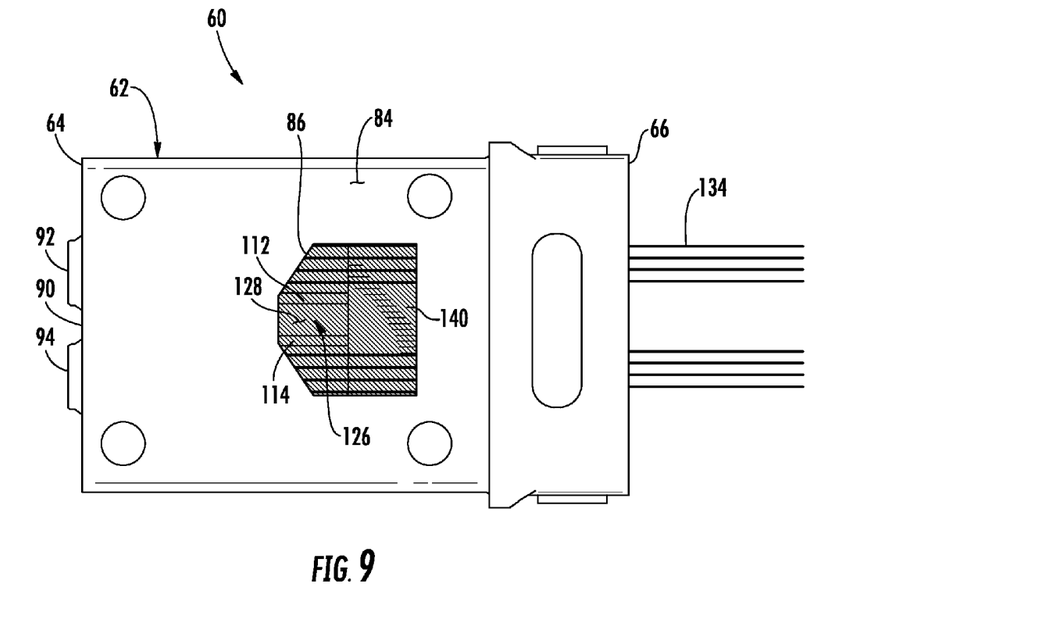
FIG. 9 is a schematic top plan view of the ferrule of FIG. 4 having a plurality of optical fibers secured thereto with an adhesive material.

To secure the optical fibers 134 within the ferrule 60, an adhesive material 140 is disposed in the cavity 80. The adhesive material 140 may be supplied into the cavity 80 through the opening 86 in the top surface 84, through the opening 82 in the back end 66 of the body 62 if the ferrule boot is not yet present, or through the ferrule boot if the ferrule boot is already present in the third section 104 of the cavity 80. The adhesive material 140 is supplied after extending the optical fibers 134 through the cavity 80, or at least the final amount of the adhesive material 140 is supplied (initial amounts may be supplied before or during insertion of the optical fibers 134, if desired).

Advantageously, the divider surface 128 may be viewed through the opening 86 in the top surface 84 while the adhesive material 140 is supplied into the cavity 80. The height of the divider surface 128 relative to the micro-holes 74 may be designed to indicate a sufficient amount of adhesive material 140 to secure the optical fibers 134 to the ferrule 60 without over-filling the cavity 80. For example, in some embodiments, the divider surface 128 is positioned closer to the first plane that extends through or below the micro-holes 74 than to the opening 86 in the top surface 84. In these or other embodiments, the divider surface 128 may be spaced from the first and second bottom surfaces 112, 114 by a distance that is less than twice a diameter of the micro-holes 74, less than 1.5 times the diameter of the micro-holes 74, or even less than the diameter of the micro-holes 74.

The supply of the adhesive material 140 into the cavity 80 can be stopped when the adhesive material 140 at least partially covers the divider surface 128. Accordingly, as mentioned above, the divider surface 128 may serve as a reference to prevent over-filling of the cavity 80, helping to ensure that a gap remains between the adhesive material 140 and the opening 86 that extends into the cavity 80 through the top surface 84 (stated differently, the gap exists between the adhesive material 140 and a top internal surface of the cavity 80). Without such a reference, persons or machines controlling the amount of adhesive material 140 supplied into the cavity 80 may have the tendency to fill the cavity 80 until the adhesive material 140 at least reaches the opening 86. When filled to such an extent, there is an increased possibility of the adhesive material 140 wicking or otherwise migrating out of the ferrule 60, which may interfere with the operation of the connector 58 once assembled (e.g., the ability of the ferrule 60 to move relative to the housing 18; see FIGS. 1-3).

As mentioned above, the particular embodiment shown includes the ferrule 60 having a dual-pedestal configuration defined by the additional end faces 92, 94. The additional end faces 92, 94 are shown as being offset from the first end face 90 in a similar manner. Furthermore, the additional end faces 92, 94 are shown as having the same rectangular shape. Different shapes/geometries will be appreciated for one or both of the additional end faces 92, 94, such as non-rectangular, elliptical, or other shapes. Regardless, the presence of two additional end faces allows quick visualization to determine that the ferrule 60 has two groups of optical fibers for mating, where the first and second groups 70, 74 are spaced apart by a distance greater than the spacing between any two adjacent micro-holes 74 in each of the first and second groups 70, 72 themselves. This may facilitate identifying an 8-fiber ferrule, or at least something other than a conventional 12-fiber ferrule like the ferrule 16 (FIGS. 1 and 2). The determination can easily be made even when a connector is assembled, as the front end 64 of the body 62 remains visible through a front opening of the housing 18 (FIGS. 1-3).

Another advantage associated with the additional end faces 92, 94—and, therefore, the dual-pedestal configuration—is that the amount of ferrule material surrounding the micro-holes 74 is less compared to conventional designs. Many ferrules, and particularly MT ferrules for MPO connectors, are polished after inserting and securing optical fibers in the micro-holes of the ferrule. The polishing is done in a manner that preferentially removes ferrule material from the end face of the ferrule relative to ends of the optical fibers, which are substantially flush with the end face prior to the preferential removal of ferrule material. The polishing process ultimately results in the optical fibers protruding slightly past the end face to ensure physical contact (and optical coupling) with the optical fibers of a mating connector or component. Thus, by having the micro-holes 74 extend from the two additional end faces 92, 94, which have a smaller total area compared to the entire frontal area of the ferrule 60, the amount of material that may need to be removed during polishing is reduced. This may enable short, less-aggressive polishing processes that reduce processing time and the amount of ferrule material initially required. In some embodiments, the two additional end faces 92, 94 may have a total area that is less than 60%, less than 50%, or even less than 40% of the area that the first end face 90 would have if there were no additional end faces/pedestals extending therefrom.

Furthermore, having the micro-holes 74 extend from the two additional end faces 92, 94 may reduce the sensitivity of a connector to contamination from particulates. In particular, the presence of particulates between a mated pair of ferrules can prevent physical contact between the optical fibers of the ferrule and detrimentally affect optical performance. Multi-fiber ferrules can be particularly at risk to such events due to relatively large contact areas of their end faces. Thus, by having the two additional end faces 92, 94 reduce the overall contact area in a mated pair of the ferrules 60, the potential for particulates to prevent physical contact between the optical fibers is reduced.

Persons skilled in optical connectivity will appreciate additional variations and modifications of the devices and methods already described. Consider, for example, the first and second bottom surfaces 112, 114 in the first section 100 of the cavity 80. In alternative embodiments, the divider 126 may not completely separate the first section 100. There may be a single bottom surface in such embodiments, with the bottom surface having a first region aligned with the first group 70 of micro-holes 74 in the longitudinal direction of the body 62 and a second region aligned with the second group 72 of micro-holes 74 in the longitudinal direction. Although the divider 126 may not completely separate the bottom surface, the divider 126 is nevertheless positioned somewhere between the first and second regions. Thus, while the figures illustrate an embodiment where the first and second bottom surfaces 112, 114 define respective first and second regions separated by the divider 126, alternative embodiments may include a single bottom surface defining first and second regions separated by the divider 126.

Now consider the micro-holes 74. In alternative embodiments, the first and second groups 70, 72 may have a different number of micro-holes 74, such as 10 each. The first group 70 may even have a different number of micro-holes 74 than the second group 72 in some embodiments. Furthermore, the micro-holes 74 in each of the first and second groups 70, 72 may be arranged in a line (as shown), array, or any other pattern on the first end face 90 of the ferrule 60.

Because these and other variations, modifications, combinations, and sub-combinations of the disclosed embodiments may occur to persons skilled in the art, the invention should be construed to include everything within the scope of the appended claims and their equivalents.

What is claimed is:
1. An optical connector, comprising:
 a ferrule comprising:
  a body having a front end and a back end, the body extending in a longitudinal direction between the front end and the back end;
  a cavity extending into the body from the back end, the body further including a top surface between the front end and the back end and an opening through the top surface into the cavity; and first and second groups of micro-holes extending from the front end of the body, through a portion of the body, and into the cavity, each micro-hole being configured to receive one of the optical fibers when the optical fibers are inserted through the cavity;

wherein the cavity further includes:

at least one bottom surface extending under at least a portion of the opening in the top surface of the body, the at least one bottom surface being positioned below a first plane that extends in the longitudinal direction and through the first and second groups of micro-holes; and a divider extending under at least a portion of the opening in the top surface of the body, the divider having a divider surface positioned above the first plane and spaced from the first and second groups of micro-holes; and a plurality of optical fibers secured to the ferrule, wherein each optical fiber extends from the back end of the body, through the cavity, and into one of the micro-holes.

2. The optical connector of claim 1, wherein:

the at least one bottom surface includes a first region aligned with the first group of micro-holes in the longitudinal direction and a second region aligned with the second group of micro-holes in the longitudinal direction; and the divider is positioned between the first and second regions of the at least one bottom surface.

3. The optical connector of claim 2, wherein the at least one bottom surface comprises first and second bottom surfaces separated by the divider and respectively defining the first and second regions of the at least one bottom surface.

4. The optical connector of claim 1, wherein the at least one bottom surface comprises first and second bottom surfaces that are co-planar, and further wherein the divider extends in the longitudinal direction and is positioned between the first and second bottom surfaces.

5. The optical connector of claim 1, wherein:

the at least one bottom surface of the cavity includes first and second groups of guides aligned with the first and second groups of micro-holes in the longitudinal direction of the body;

each of the guides is configured to direct one of the optical fibers into one of the micro-holes when the optical fibers are inserted through the cavity; and the divider is positioned between the first and second groups of guides.

6. The optical connector of claim 5, wherein each of the guides in the first and second groups of guides comprises a v-groove in the at least one bottom surface.

7. The optical connector of claim 1, wherein the first and second groups of micro-holes each consist of four micro-holes.

8. The optical connector of claim 1, wherein:

the cavity includes at least first and second sections having different cross-sectional areas in planes perpendicular to the longitudinal direction; and the first and second groups of micro-holes extend from the front end of the body to the first section of the cavity.

9. The optical connector of claim 8, wherein:

the first section of the cavity has a first cross-sectional area in a first plane perpendicular to the longitudinal direction;

the second section of the cavity has a second cross-sectional area in a second plane perpendicular to the longitudinal direction; and the second cross-sectional area is greater than the first cross-sectional area.

10. The optical connector of claim 8, wherein:

the first section of the cavity has a first depth measured relative to the top surface of the body;

the second section of the cavity has a second depth measured relative to the top surface; and the second depth is greater than the first depth.

11. The optical connector of claim 8, wherein the opening on the top surface of the body extends over at least a portion of the second section of the cavity.

12. The optical connector of claim 11, wherein:

the cavity further includes a third section having a greater cross-sectional area than the second section in a plane perpendicular to the longitudinal direction; and the third section extends between the second section and the back end of the body.

13. The optical connector of claim 1, wherein the divider surface is positioned closer to the first plane than to the opening in the top surface of the body.

14. The optical connector of claim 1, wherein the divider surface is spaced from the at least one bottom surface by a distance that is less than twice a diameter of the micro-holes.

15. The optical connector of claim 1, further comprising:

an adhesive material bonding the plurality of optical fibers to the ferrule within the cavity, wherein the adhesive material covers at least a portion of the divider surface.

16. The optical connector of claim 15, wherein the cavity in the body of the ferrule includes a gap between the adhesive material and the opening that extends into the cavity through the top surface of the body.

17. A method of terminating a plurality of optical fibers with a ferrule that includes a body having a front end and a back end, a cavity extending into the body from the back end, and first and second groups of micro-holes extending from the front end of the body, through a portion of the body, and into the cavity, the method comprising:

extending the optical fibers through the back end of the body of the ferrule, through the cavity of the body, and into the first and second groups of micro-holes;

disposing an adhesive material in the cavity of the body to secure the optical fibers to the ferrule, wherein:

the body of the ferrule further includes a top surface between the front end and the back end and an opening through the top surface into the cavity;

the cavity of the ferrule further includes at least one bottom surface and a divider extending under at least a portion of the opening in the top surface of the body, the at least one bottom surface being positioned below a first plane that extends in the longitudinal direction and through the first and second groups of micro-holes, the divider having a divider surface positioned above the first plane and spaced from the first and second groups of micro-holes; and the adhesive material is disposed in the cavity by:

supplying the adhesive material into the cavity;

viewing the divider surface through the opening in the top surface of the body of the ferrule while the adhesive material is supplied; and stopping the step of supplying the adhesive material, wherein the divider surface is used as a reference so that the stopping is based on viewing when the adhesive material covers at least a portion of the divider surface.

18. The method of claim 17, wherein the step of supplying the adhesive material is performed after extending the optical fibers through the cavity.

19. The method of claim 17, wherein the adhesive material is supplied into the cavity via the opening in the top surface of the body of the ferrule.

20. The method of claim 17, wherein stopping the step of supplying is performed so that a gap remains between the adhesive material and the opening through the top surface of the body.

* * * * *